(12) United States Patent
Dujmovic

(10) Patent No.: US 8,473,943 B2
(45) Date of Patent: Jun. 25, 2013

(54) USING ECOPRINT FOR CLONING OF APPLICATIONS

(75) Inventor: Ivo Dujmovic, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 968 days.

(21) Appl. No.: 12/550,631

(22) Filed: Aug. 31, 2009

(65) Prior Publication Data

US 2011/0055804 A1 Mar. 3, 2011

(51) Int. Cl.
*G06F 9/445* (2006.01)

(52) U.S. Cl.
USPC .......................................... 717/175; 717/106

(58) Field of Classification Search
USPC .................. 717/174–178, 106–113
See application file for complete search history.

(56) References Cited

U.S. PATENT DOCUMENTS 7,478,386 B2 * 1/2009 Dietrich et al. ............... 717/175

OTHER PUBLICATIONS

Peachpit, "Creating and Deploying Packages", Aug. 2006, retrieved from http://www.peachpit.com/articles/article.aspx?p=605381, 26 pages.*

Cruz, "Distributing with PackageMaker—Building a distribution installer package", 2006, MacTech, Apple Computers, vol. No. 22, Issue No. 12, 20 pages.*

* cited by examiner

*Primary Examiner* — Ted T Vo

(74) *Attorney, Agent, or Firm* — Kilpatrick Townsend & Stockton LLP

(57) ABSTRACT

Methods and systems for automating technology integrations are presented. A source application system that connects to external technologies, such as plug-ins, is ported from one computing environment or ecosystem to another and thereby integrated on the other ecosystem. The porting is facilitated by the extraction of information and code from the source environment, creating an XML "ecoprint" payload file, copying the ecoprint file to the target system, and applying an integration defined by the XML ecoprint payload file to connect and otherwise integrate the application system with external technologies in the target environment.

17 Claims, 7 Drawing Sheets

USING ECOPRINT FOR CLONING OF APPLICATIONS

CROSS-REFERENCES TO RELATED APPLICATIONS

Not Applicable

BACKGROUND OF THE INVENTION

1. Field of the Invention

The present disclosure relates generally to the field of data processing and installation of software. Specifically presented are systems and methods for automating technology integrations such as porting an enterprise-level application that connects to external technologies from one environment or "ecosystem" to another.

2. Description of the Related Art

A software application typically resides on a computer or set of computers. The computer hardware can be hooked to a network, such as an intranet or the Internet. The computer or set of computers, components, attached peripherals, and other hardware, along with their operating systems, applications, plug-ins, settings, connections, and other software, constitute what is sometimes called an "ecosystem." A software application that functions properly in one ecosystem (e.g., a development environment or laboratory) may not work properly in another ecosystem (e.g., a production system or customer's office network). Among other things, small differences in available components or software settings may render a part of or the whole software application inoperable.

Often, it is important that a software application developed on one ecosystem (i.e., a source ecosystem) function properly in another ecosystem (i.e., a target ecosystem). Therefore, much time, labor, and planning effort has been spent attempting to ensure that applications are integrated and tested properly on target ecosystems. Retail applications, of which thousands or millions of copied are sold, are often distributed with a specially designed installation executable that installs the retail application to a target environment (e.g., a retail customer's PC). The specially designed executables are typically self-contained (versus referring to many libraries), patched fewer times, with shorter lifespans, and tested on many different source environments before distribution; however, their one-size-fits-all approach may not be suitable for mission critical, high-end applications. High-end applications, for which fewer copies are distributed, are more heavily integrated into their ecosystem and patched with many patches over decades of use. They are often cloned or copied from a specialized source environment to a target environment and then manually integrated with their ecosystem.

In cloning an application system, sometimes called a "source application system," customers either manually or through the use of tools create a copy of the file system image. The new image's configuration files are re-configured or modified so as to be able to restart the technology and application machine processes, creating a new application instance, sometimes called a "target application system." Then, the customer hires consultants to manually re-integrate the target application system with other applications and technologies external to the source application system with which the source system was integrated. Often, the consultants will scavenge or otherwise analyze the source environment in great detail to understand how the source application system interacts with the source environment before integration. Understanding how the source application system interacts with the source environment can help determine how to integrate the application system on the target environment. This process is sometimes called an "external integration" between the source application system and its application ecosystem.

Some enterprise level applications are written to interoperate with each other and are bundled in 'suites.' Such applications can include enterprise resource planning, customer relationship management, and supply-chain management applications, among other software applications. These applications can further be integrated with other applications, sometimes referred to as "external technologies."

External technologies can include plug-ins and other software that are called from, referenced to, serviced by, or otherwise directly or indirectly connected to the application.

As many applications have become mission critical for businesses, it has become more and more important to ensure those applications are thoroughly integrated and tested. Such integrations typically require experienced, skilled, and knowledgeable information systems consultants who spend time and effort to understand the source and target environments. Consequently, costs have escalated for external integrations of mission critical software applications.

BRIEF SUMMARY OF THE INVENTION

Embodiments in accordance with the present disclosure relate to methods and systems for cloning or otherwise porting an application from one hardware/software environment to another. The source application system and its connections with external technologies in a source ecosystem can be scanned to determine an "ecoprint" of the source application in the source ecosystem. In addition, the source ecosystem can be mined to determine possibly relevant settings and code which may be relied upon by the source application. This scanning and mining can include the automated scanning of references of foreign objects and entities within the file system and the databases of the source system. From the determined ecoprint and settings, an ecoprint file can be created. This ecoprint file includes information which captures external ecosystem integration information relevant portions of the state of the source application and the source ecosystem. The ecoprint file can then be packaged into an integration payload file, along with other files. The integration payload file is then copied, moved, or otherwise transferred to a target ecosystem and extracted. The ecoprint file can then be used to integrate the application on the target system with external technologies on the target system.

An integration action, which can be called "loading" or "stamping," can include integration to work with a new file system, a new machine name, and runtime parameters such as port numbers (e.g., a new port range). Configuration settings, called "ecoprint settings," cover the integration of the system.

Configuration settings or elements of an application can include integration elements and references to external technology that help delineate the behavior of the application.

The ecoprint file that includes the configuration settings is preferably an extensible markup language (xml) file. The file can include a command reference or references to code that can implement parts of an integration. The file, which can be multiple files, can be federated into a single, standard distribution file, such as a zip file (or self-extracting zip file), a tar file, a cab file, and other such archive and/or compression and/or data recovery file formats as known in the art.

One embodiment relates to a method of porting from one computing environment to another an application that connects to an external technology. The method includes extracting a set of information and a set of code from a source environment. The set of information includes external integration information between an application and an external technology. The method includes creating a definition file (discussed below) having a technology definition section, feasibility information section, and a configuration section using the set of information. The method further includes packaging the definition file and the set of code into an integration payload file, the set of information and the set of code defining the integration. The method can also include transferring the payload file to a target environment and applying the integration defined in the payload file to the target environment. The integration connects the application and the external technology in the target environment.

Yet other embodiments relate to systems and machine-readable tangible storage media which employ or store instructions for the methods described above.

A further understanding of the nature and the advantages of the embodiments disclosed and suggested herein may be realized by reference to the remaining portions of the specification and the attached drawings.

The figures will now be used to illustrate different embodiments in accordance with the invention. The figures are specific examples of embodiments and should not be interpreted as limiting embodiments, but rather exemplary forms and procedures.

DETAILED DESCRIPTION OF THE INVENTION

Figure 1:
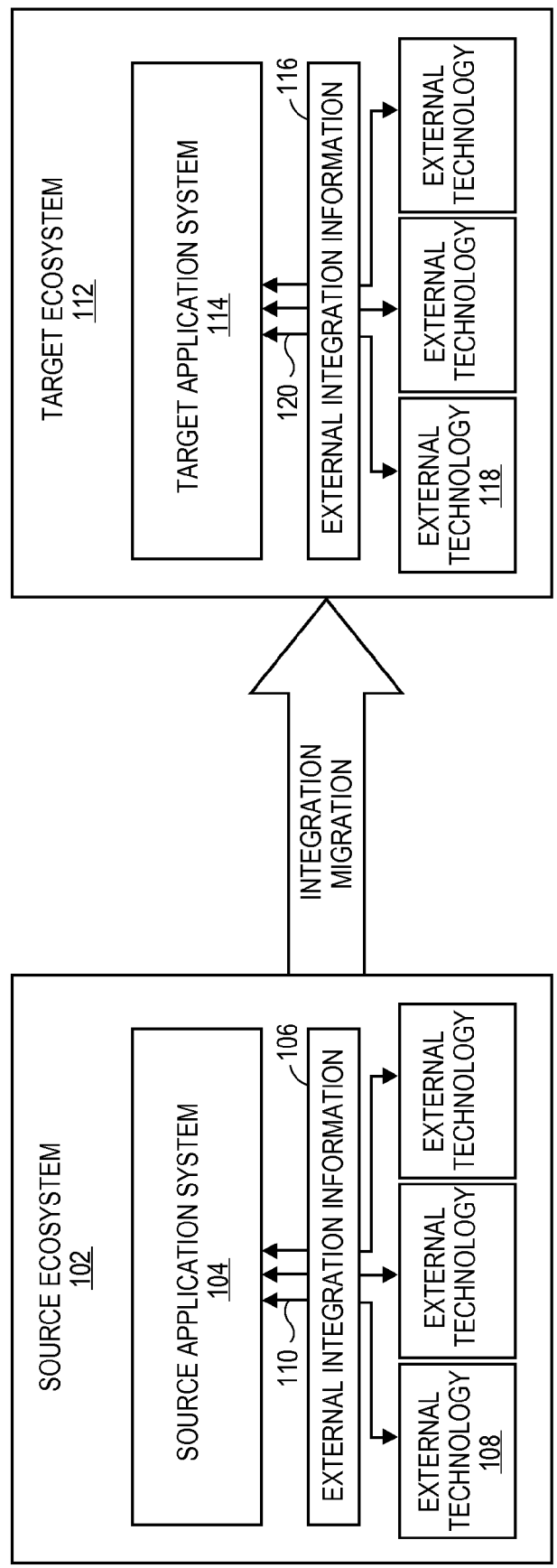
FIG. 1 illustrates a source and target ecosystem.

FIG. 1 illustrates a source and target ecosystem with applications integrated in accordance with an embodiment. Source ecosystem 102 includes computers, components, peripherals, storage devices, network devices, and other hardware that make up a computing environment. Source ecosystem 102 also includes operating systems, settings, registries, applications, plug-ins, terminate and stay residents executables, web services, and other software running, resident, or configured on the hardware. In the exemplary embodiment, source ecosystem 102 is a test environment with a relatively small set of hardware running a single operating system.

Source application system 104 is integrated on source ecosystem 102. Source application system 104 includes any number of software applications (e.g., a suite of software applications) and integrated modules, plug-ins, and other software components. Source application system 104 is to be moved, copied, or otherwise transferred to another system (discussed below). Source application system 104 has references to, references from, reliances, shared settings, or otherwise has direct or indirect external connections 110 to external technologies, such as external technology 108.

External technology 108 can include applications, plug-ins, dynamic-link libraries, or other computer software not in the core group of source application system 104 software. For example, external technology 108 can be any software that is not part of a default installation of source application system 104.

External integration information 106, which is part of the source ecoprint definition file, is extracted from source ecosystem 102 and used to create a definition file which can be packaged in a payload file or set of payload files. The payload file and its contents thus define the integration of source application system 104.

External integration information 106 includes information about external connections 110 as well as information about source ecosystem 102 or the environment in which source application system 104 runs. External integration information can include source code or other computer-readable instructions that help define or perform an integration. One embodiment can automatically scan source ecosystem 102 to gather external integration information.

Using external integration information 106 (i.e., part of the ecoprint of source application system 104), source application system 104 can be integrated on another ecosystem with other external technologies.

An integration on the other ecosystem can be previewed (or reviewed) by an administrator or operator to determine which elements of an application system are to be applied. The administrator can be given a list of elements to transfer over and install to the target system, and said administrator can exercise control over which elements will be applied. For example, a list of elements to transport over and install may be given in an interactive user prompt in which the user (administrator) can select or deselect elements or components to install. The list of elements can effectively be the payload file.

The descriptions for target ecosystem 112, target application system 114, target external integration information 116, target external technology 118, and target external connections 120 are generally the same as for their source counterparts with the exception that they are on target ecosystem 112. In the exemplary embodiment, target application system 114 is a copy of source application system 104. Target external technology 118 is the same as external technology 108 but with a different version, instance identifiers, and thus slightly different characteristics.

Continuing with the explanation of the exemplary embodiment, the payload file (or set of files) is compressed into a zip format or otherwise prepared for transport into a single payload zip file. The resulting payload zip file is moved, copied, ftp'd (using file transfer protocol), or otherwise transferred to target ecosystem 112 where the payload zip file is uncompressed, extracted, or otherwise unpackaged for access on target ecosystem 112.

Using the payload zip file, the integration defined by the definition file and other contents of the payload file are applied to the target environment, thus connecting the target application system 114 to the target external technologies. The target external technologies, such as target external technology 118, are pre-installed or separately placed on target ecosystem 112.

An embodiment extracts target information from the target environment, target ecosystem 112, installs, auto-executes, or otherwise deploys a script section, and sets one or more configurations in target ecosystem 112.

Figure 2A:
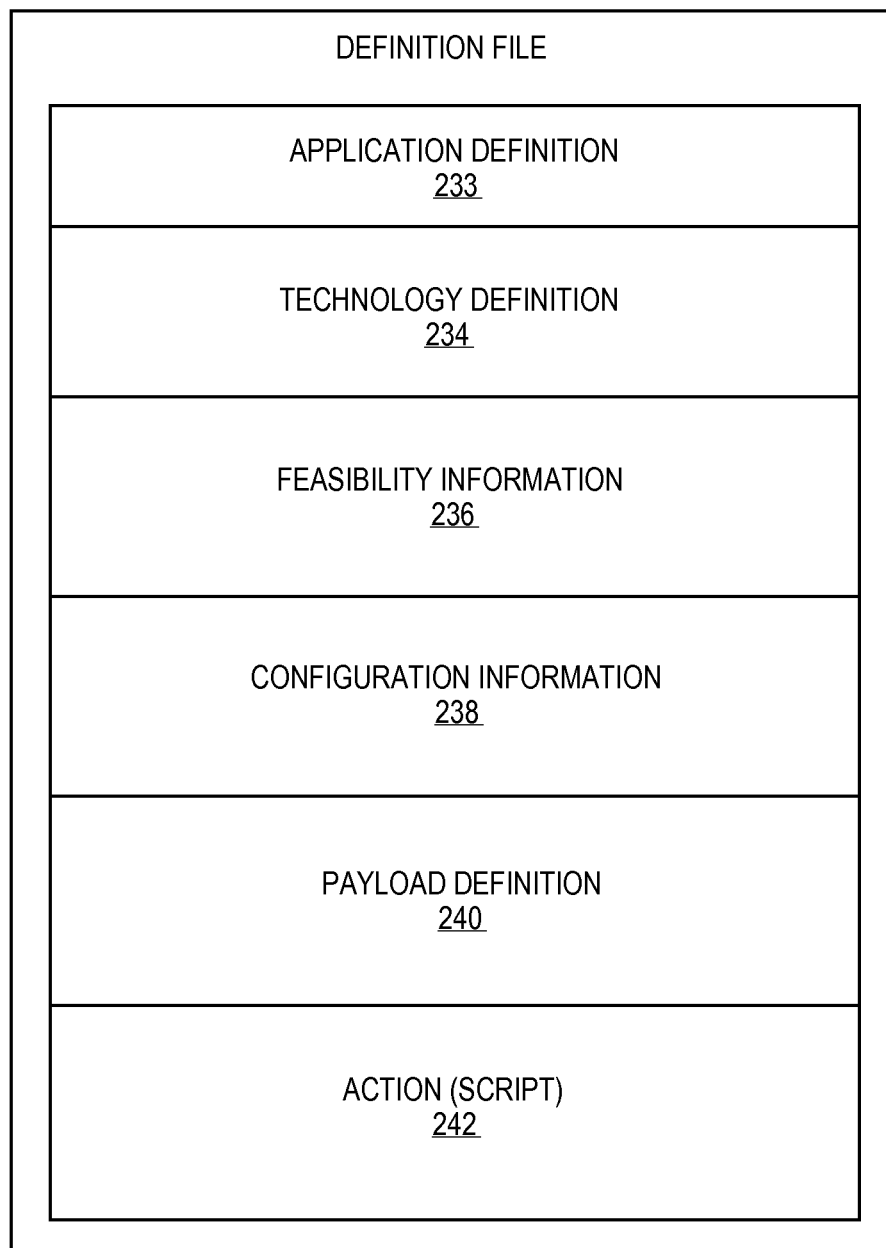
FIG. 2A illustrates a definition file in accordance with an embodiment.

FIG. 2A illustrates a definition file in accordance with an embodiment. Definition files include configuration elements, code and/or methods for integration, and registration and/or provisioning information. Types of definition files include: (1) an "ecoprint" external information definition file and (2) a technology information definition file. An ecoprint definition file carries configuration information and code references for integrating with one or more external technologies. A technology information definition file is largely the same format as an ecoprint definition file but from the point of view of an external technology.

As shown in the figure, definition file 232 has several sections, including sections 233-242. More sections can be included in the file as necessary to integrate the system, or sections can be omitted if they are not necessary or are unused.

Application (source system) definition section 233 includes names and definitions of various external technologies that are integrated with a source application system. For example, the name and globally unique identifier (GUID) of an essential add-in can be included.

Technology definition section 234 includes names and definitions of various external technologies that are integrated with a source application system.

Feasibility information section 236 includes information on what versions and deployment types the technologies must possess of an integration to be feasible. For example, a server process may have to be started in servlet mode as opposed to server mode for the integration to be feasible. As another example, feasibility information section 236 can include version information for a type library.

Configuration information section 238 includes configuration needs for the integration. For example, the type of communication protocol, such as hypertext transport protocol (HTTP) or HTTP over Secure Socket Layer (HTTPS), can be included. Other examples of configuration needs include the identifiers of the web entry host, web entry domain and port, accelerator, web entry portal, regular protocol, local protocol, and node list.

Payload definition section 240 includes a list of files or code that will require packaging for the integration. This can include files with connectivity code for adaptors and plug-ins.

Script section 242 defines functions and methods for configuration, feasibility, etc. For example, configuration methods to set up load balancing on a set of nodes as well as what actions to perform upon a failure are defined. Script section 242 can include code for target definitions and action names by which the code will be invoked. Payload methods can include code and/or document references, such as readme files which instruct an installing technician on manual steps to the installation process.

A technology definition file is essentially the same format as an ecoprint file except that a technology definition file is created from an external technology's point of view. A technology definition file can be provided by a third party who manufactures the external technology.

Definition files are preferably coded in extensible markup language (xml). However, other formats besides xml are envisioned, including format in ASCII, binary, or other encodings.

Figure 2B:
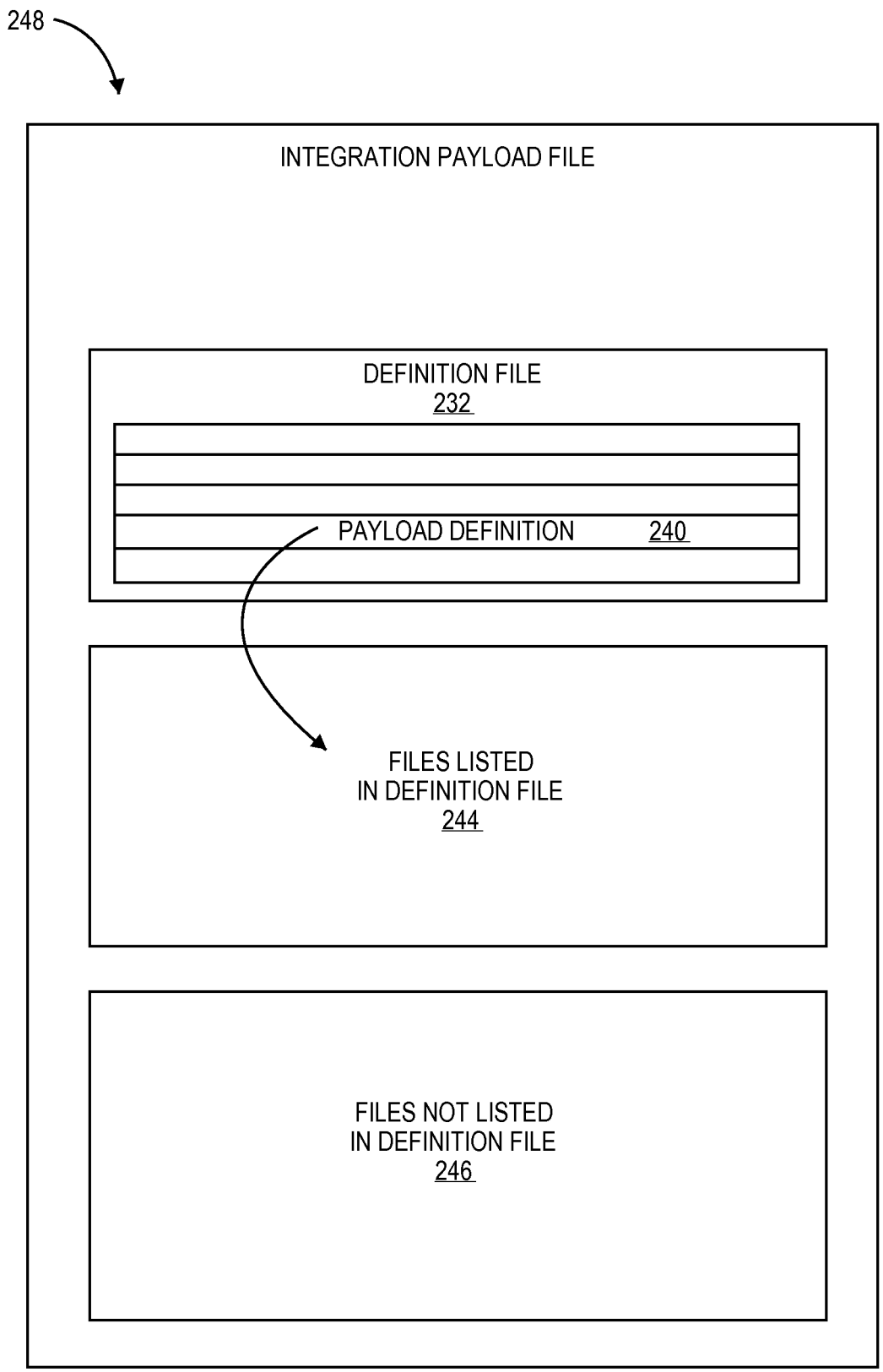
FIG. 2B illustrates an integration payload file in accordance with an embodiment.

FIG. 2B illustrates an integration payload file in accordance with an embodiment. Definition file 232 is packaged into integration payload file 248, sometimes simply called a "payload file." Payload definition section 240 of definition file 232 includes a list of files that are packaged for integration. Those files are packaged in integration payload file 248 as listed files 244. Other files 246 which are not listed in definition file 232 are included in integration payload file 248. Other files 246 can include files that were manually entered into the payload file and not automatically scanned from the source ecosystem. This allows flexibility in packaging. Other files 246 can also be the files defined in or created by the packaging scripts, such as those in script 242.

Figure 3A:
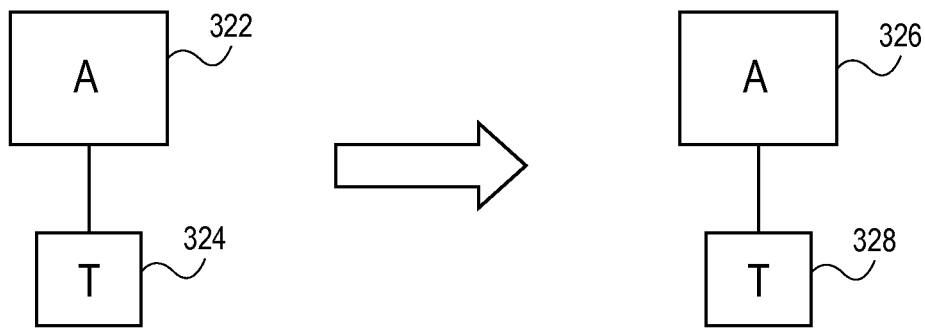
FIG. 3A illustrates one family of three main use cases for extraction, transport, and stamping in accordance with an embodiment.
Figure 3B:
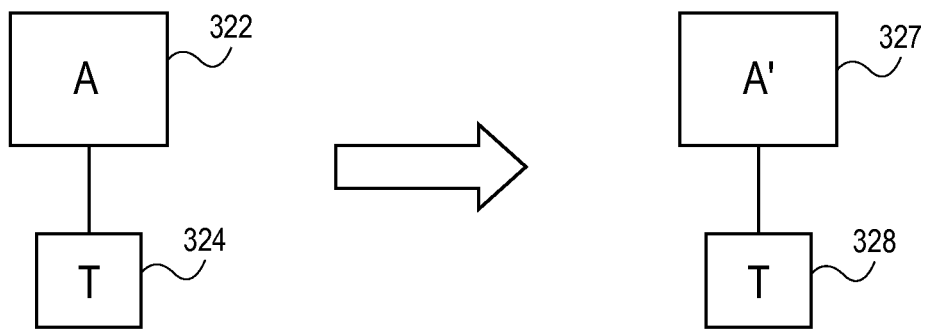
FIG. 3B illustrates another family of three main use cases for extraction, transport, and stamping in accordance with an embodiment.
Figure 3C:
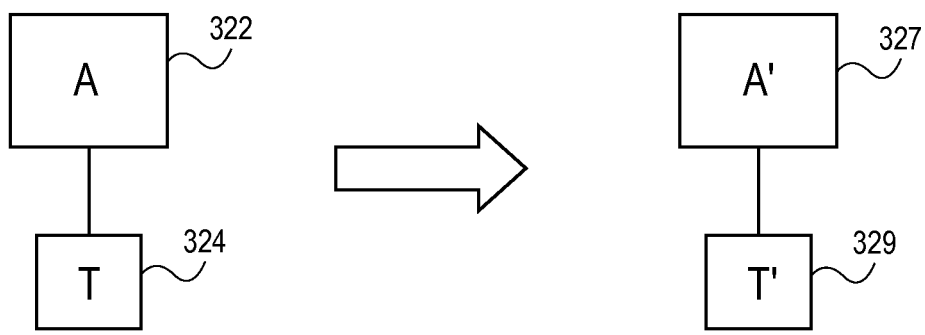
FIG. 3C illustrates another family of three main use cases for extraction, transport, and stamping in accordance with an embodiment.

FIGS. 3A-3C illustrate three families corresponding to three main use cases for extraction, transport, and stamping in accordance with an embodiment. On the left side of each figure is an application system and external technology in a source environment, and on the right side of each figure is an application system and external technology in a target environment.

FIG. 3A illustrates a relatively simple external technology integration process that can integrate a software suite with external technologies. In the exemplary embodiment, a new certified technology can be integrated with an existing software suite install. Also, a new node can be integrated into an existing single or multimode instance, and the new node can be integrated with external technologies as well.

Source application system 322 may be embodied as source application system 104 (of FIG. 1), and external technology 324 may be embodied as external technology 108 in source ecosystem 102.

Target application systems 326 and 327 are installed instances of the unmodified and modified, respectively, source application systems on the target environment. Likewise, target external technologies 328 and 329 are installed instances of unmodified and modified, respectively, target technologies on the target environment.

It is preferable that some steps occur at the source and some steps occur at the target. In the exemplary embodiment of FIG. 3A, steps that occur at the source include determining the target environment and selecting from a stored extraction the matching technology in question. Preparatory actions for technology integration include registering external technology 324 ("T") in source application 322 ("A"), packaging of a payload, and performing target technology configuration preparation. Steps that then occur on the target include stamping/integrating and activating. Stamping or integrating can be by remote integration (RI), which can require that the target's application programming interfaces (APIs) are remotely invocable. Stamping or integration can also use a remote invocation client (RIC), which can assume that the target's client code was delivered to the source. Stamping or integrating can, of course, be performed by payload delivery and launch (PDL), which assumes that the target's client code was delivered to the source. A final step that can then occur on the source include configuring the source and activating the link.

FIG. 3B illustrates an alternate integration, where the goal is to integrate a target suite of applications A' with the same technology component T which is currently integrated with a source suite of applications A. In the exemplary embodiment, a new or existing suite of applications can be integrated, such as integrating a test instance with the same external technology component as in a production instance because of a need to share resources.

As in the previously described embodiment, it is preferable that some steps occur at the source and some steps occur at the target. In the exemplary embodiment of FIG. 3B, steps that occur at the source include determining the target environment and performing extraction of information in source A. Preparatory actions for technology integration include packaging of the payload and configuring the target technology configuration. Steps that then occur on the target include stamping in target instance A' and stamping or integrating, either by RI, RIC, or PDL as described previously.

FIG. 3C illustrates yet another alternate integration, where the goal is to configure and integrate target application A' with technology component T' in the same way as it is configured for source application A with external technology T. In the exemplary embodiment, an existing suite of applications is cloned to a target system without sharing the same technology component servers for testing purposes. This can be for the purpose of creating the same business model for a new company or business.

In the exemplary embodiment of FIG. 3C, steps that occur at the source include extracting environment information into a package or payload file. The package includes required data for A' and changes for T'. An administrator is interviewed to determine relevant and desirable portions of the integration, and the integration information is modified per the interview. The integration information is then used to stamp or integrate A' and T' in the target environment.

An application with multi-node dimensionality can add two subcases to the family of use cases discussed above. A first subcase will include multi-node source application extraction. A second subcase will include multi-node target application stamping.

A technology with multi-node dimensionality can add one subcase to the family of use cases. That subcase will include multi-node target technology stamping.

Although a single node is a simplifying assumption, one skilled in the art could envision multiple target nodes.

Figure 4:
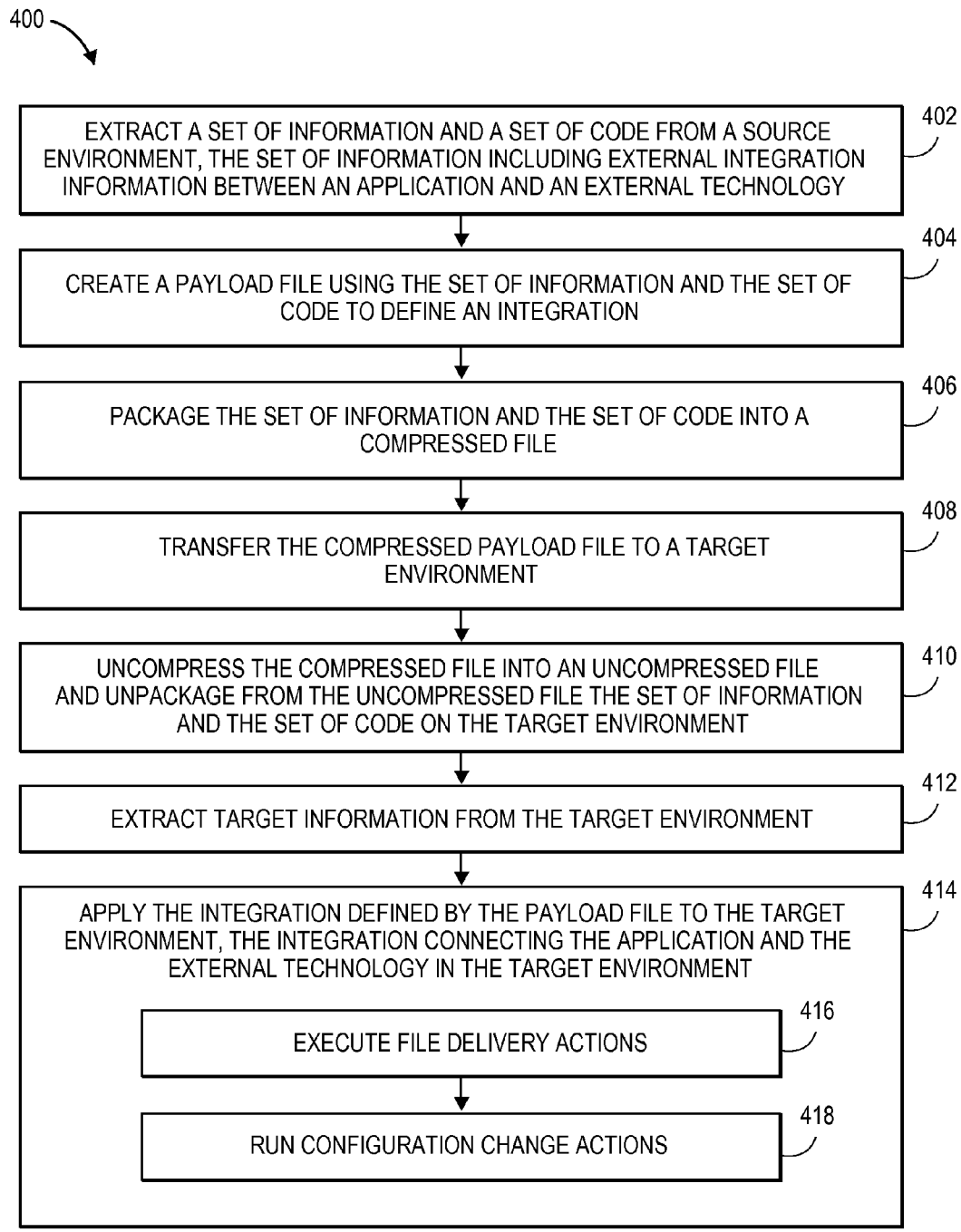
FIG. 4 is a flowchart illustrating an embodiment in accordance with the present invention.

FIG. 4 shows an example flowchart illustrating a process in accordance with one embodiment. This process can be automated in a computer or other machine. The process can be coded in software, firmware, or hard coded as machine-readable instructions and run through a processor that can implement the instructions. In operation 402, a set of information and a set of code is extracted from a source environment. The set of information includes external integration information between an application and an external technology. In operation 404, a payload file is created using the set of information and the set of code to define an integration. In operation 406, the set of information and the set of code are packaged into a compressed file. In operation 408, the compressed payload file is transferred to a target environment. In operation 410, the compressed file is uncompressed into an uncompressed file. The set of information and the set of code are further unpackaged from the uncompressed file on the target environment. In operation 412, target information is optionally extracted from the target environment. In operation 414, the integration defined by the payload file is applied to the target environment. The integration connects the application and the external technology in the target environment. In operation 416, a script is deployed from the payload file in order to assist in the integration and execute file delivery actions. In operation 418, a configuration is set in the target environment based on information in the payload file. These operations may be performed in the sequence given above or in different orders as applicable.

Fingerprinting, or the hash of definition files without any instance, can identify a payload with an application definition and technology definition identity. Alternatively, fingerprinting can identify a definition with just a technology definition identity. This can be used for quick comparisons of instance integrations.

Figure 5:
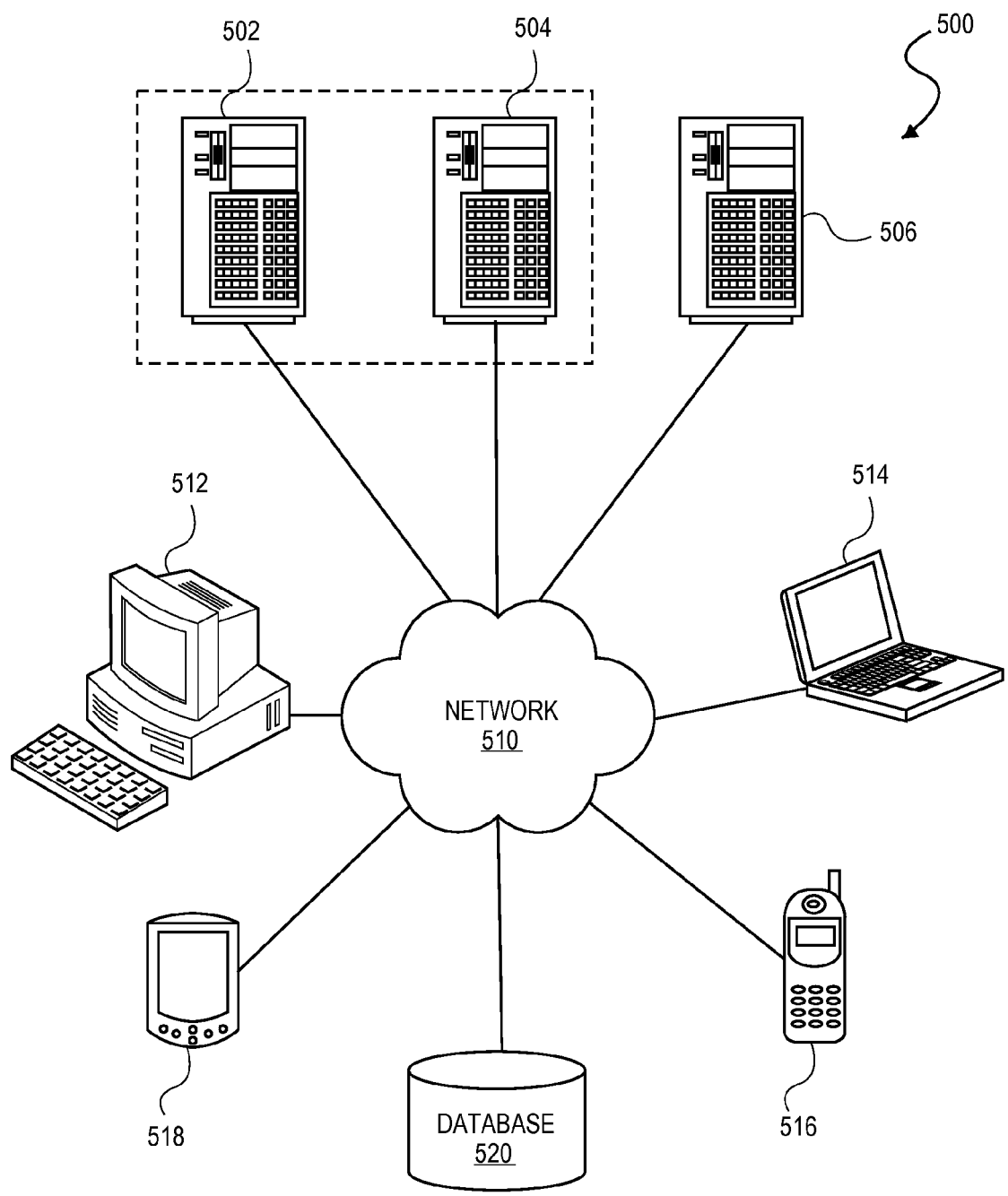
FIG. 5 illustrates components of a computer network that can be used in accordance with one embodiment.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
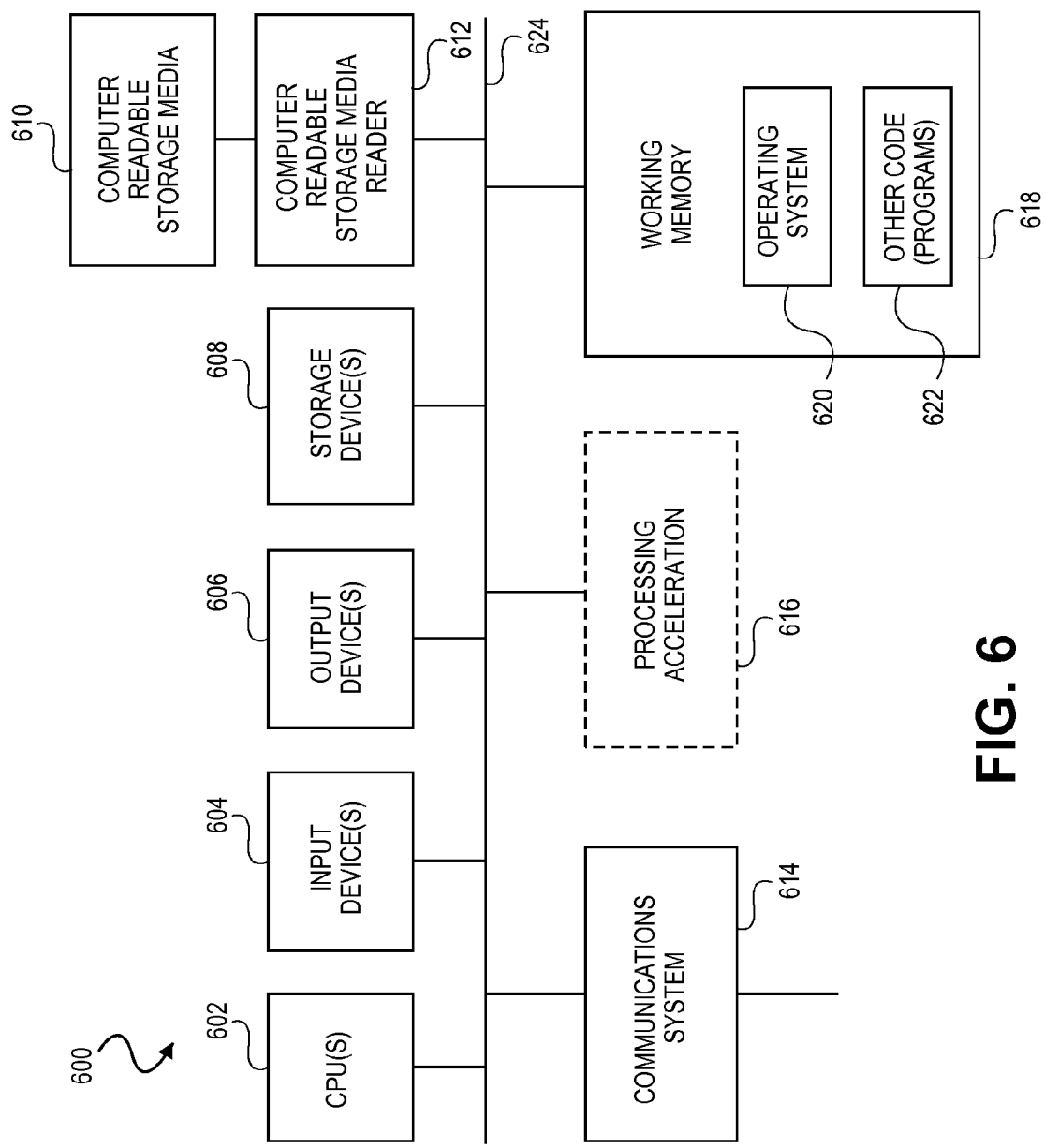
FIG. 6 illustrates components of a computerized device that can be used in accordance with one embodiment.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method of porting from one computing environment to another an application that connects to an external technology, the method comprising:
   extracting, using a processor, a set of information from a source environment, the set of information including external integration information that defines how an application interacts with an external technology;
   extracting, using the processor, a set of code from the source environment, the set of code adapted for integration;
   creating, in a memory operatively coupled to the processor, a definition file having a technology definition section, feasibility information section, and configuration section using the set of information; and
   packaging, using the processor, the definition file and the set of code into a payload file, the set of information and the set of code defining an integration, the integration adapted to facilitate porting the application from one computing environment to another.

2. The method of claim 1 wherein creating the definition file further includes creating a payload definition section and a script section in the definition file.

3. The method of claim 2 wherein extracting the set of code further includes building a script for configuring the application with the external technology.

4. The method of claim 1 further comprising:
   transferring the payload file to a target environment; and
   applying, using a second processor, the integration defined by the payload file to the target environment, the integration connecting the application and the external technology in the target environment.

5. The method of claim 4 wherein applying includes:
   extracting, using the second processor, target information from the target environment;

deploying, using the second processor, a script from the payload file; and setting a configuration in the target environment based on the payload file.

6. The method of claim 1 further comprising:

compressing, using the processor, the payload file into a compressed file; and uncompressing the compressed file into an uncompressed file and unpackaging from the uncompressed file the definition file and the set of code on the target environment.

7. The method of claim 6 wherein the compressed file comprises a zip file.

8. The method of claim 1 further comprising:

interviewing an operator using a display to determine relevant and desirable portions of the integration; and modifying, using the processor, the external integration information based on the interview.

9. The method of claim 1 wherein the set of code comprises a plug-in.

10. The method of claim 1 further comprising validating, using the processor, the payload file by unraveling a dependency chain within the file.

11. The method of claim 1 wherein the payload file comprises an extensible markup language (xml) file.

12. The method of claim 1 wherein the technology definition section of the definition file includes names and definitions of external technologies integrated with the application in the source environment.

13. The method of claim 1 wherein the feasibility information section of the definition file includes particular versions and deployment types of the external technologies for integration of the application in a target environment.

14. A non-transitory machine-readable storable medium embodying information indicative of instructions for causing one or more machines to perform operations for porting an application connecting to an external technology from one environment to another, the operations comprising:

extracting a set of information from a source environment, the set of information including external integration information that defines how an application interacts with an external technology;

extracting a set of code from the source environment, the set of code adapted for integration;

creating a definition file having a technology definition section, feasibility information section, and configuration section using the set of information; and packaging the definition file and the set of code into a payload file, the set of information and the set of code defining an integration, the integration adapted to facilitate porting the application from one computing environment to another.

15. The non-transitory machine-readable storable medium of claim 14 further comprising:

transferring the payload file to a target environment; and applying the integration defined by the payload file to the target environment, the integration connecting the application and the external technology in the target environment.

16. A system for porting an application connecting to an external technology from one environment to another comprising:

a processor operatively coupled to a memory;

code in the memory to extract a set of information from a source environment, the set of information including external integration information that defines how an application interacts with an external technology;

code to extract a set of code from the source environment, the set of code adapted for integration;

code to create a definition file having a technology definition section, feasibility information section, and configuration section using the set of information; and code to package the definition file and the set of code into a payload file, the set of information and the set of code defining an integration, the integration adapted to facilitate porting the application from one computing environment to another.

17. The system of claim 16 further comprising:

code in the memory enabled to transfer the payload file to a target environment; and code enabled to apply the integration defined by the payload file to the target environment, the integration connecting the application and the external technology in the target environment.

* * * * *

UNITED STATES PATENT AND TRADEMARK OFFICE
CERTIFICATE OF CORRECTION

PATENT NO. : 8,473,943 B2
APPLICATION NO. : 12/550631
DATED : June 25, 2013
INVENTOR(S) : Dujmovic Page 1 of 1

It is certified that error appears in the above-identified patent and that said Letters Patent is hereby corrected as shown below:

In the Specification

In column 8, line 37, delete "GRPS," and insert -- GPRS, --, therefor.

Signed and Sealed this
Twenty-second Day of October, 2013

Teresa Stanek Rea
*Deputy Director of the United States Patent and Trademark Office*